United States Patent
Chen et al.

(10) Patent No.: US 7,898,598 B2
(45) Date of Patent: Mar. 1, 2011

(54) METHOD AND APPARATUS FOR VIDEO MODE JUDGEMENT

(75) Inventors: Tsui-Chin Chen, Hsinchu (TW); Hsiao-Ming Huang, Kaohsiung (TW)

(73) Assignee: Novetek Microelectronics Corp., Hsinchu (TW)

( * ) Notice: Subject to any disclaimer, the term of this patent is extended or adjusted under 35 U.S.C. 154(b) by 1330 days.

(21) Appl. No.: 11/308,809

(22) Filed: May 10, 2006

(65) Prior Publication Data

US 2007/0195202 A1    Aug. 23, 2007

(30) Foreign Application Priority Data

Feb. 17, 2006    (TW) .............................. 95105360 A

(51) Int. Cl.
    H04N 5/46    (2006.01)
(52) U.S. Cl. .................. 348/558; 348/555; 348/701
(58) Field of Classification Search ......... 348/441–459, 348/553–558, 700–702
    See application file for complete search history.

(56) References Cited

U.S. PATENT DOCUMENTS

| | | | |
|---|---|---|---|
| 5,398,071 A | 3/1995 | Gove et al. .................. 348/558 |
| 5,689,301 A | 11/1997 | Christopher et al. .......... 348/97 |
| 5,861,924 A * | 1/1999 | Pan et al. .................... 348/451 |
| 6,201,577 B1 | 3/2001 | Swartz ....................... 348/558 |
| 6,580,463 B2 | 6/2003 | Swartz ....................... 348/558 |
| 6,700,622 B2 * | 3/2004 | Adams et al. ............... 348/448 |
| 2006/0209957 A1 * | 9/2006 | Riemens et al. ........ 375/240.16 |

* cited by examiner

*Primary Examiner*—M. Lee
(74) *Attorney, Agent, or Firm*—Jianq Chyun IP Office

(57) ABSTRACT

A method and an apparatus for judging video modes are provided. The method compares the values of the corresponding pixels of two consecutive frames in a video data to obtain a difference value between the two frames and then all of the difference values between any two consecutive frames are collected to form a difference value sequence. The difference value sequence is further amplified by a high pass filter and then compared with a threshold value. The comparison result is provided for successively judging the movie mode of the video data. Since the amplified signal values are suitable for emphasizing the difference of each frame, the provided method is capable of more correctly identifying the movie mode of the original video data, which further eliminates the drawback in the prior art that it is hard to determine the threshold value or to judge the movie mode thereof.

19 Claims, 8 Drawing Sheets

METHOD AND APPARATUS FOR VIDEO MODE JUDGEMENT

CROSS-REFERENCE TO RELATED APPLICATION

This application claims the priority benefit of Taiwan application serial no. 95105360, filed on Feb. 17, 2006. All disclosure of the Taiwan application is incorporated herein by reference.

BACKGROUND OF THE INVENTION

1. Field of Invention

The present invention relates to a method for processing videos, and particularly to a method and an apparatus for processing videos, which are capable of correctly judging video modes.

2. Description of the Related Art

Among conventional film modes, shooting movies on film is very common, in which 24 complete frames are recorded per second (24 fps), while the file format thereof requires to record a footage in a film rate of 24 fps too. In comparison with the 24 fps film rate, however, there are other film modes where a footage is recorded in a rate of 30 complete frames per second (30 fps), while the file format thereof requires to record a footage in a film rate of 30 fps as well.

The conventional video broadcasting media, for example, cable TV or broadcast TV, usually use NTSC or PAL broadcasting mode to transmit video signals, where NTSC refers to National Television System Committee and PAL refers to Phase Alternative Line. For NTSC broadcasting mode, the broadcasting frequency is set to 60 Hz, that is, a user end would receive 60 interlaced frames per second from a TV station, while for PAL broadcasting mode, the broadcasting frequency is set to 50 Hz. The above-mentioned interlaced frames mean that for an odd frame, only all odd scan lines, for example, $1^{st}$, $3^{rd}$, $5^{th}$ and so on, are accompanied with images and no image exists corresponding to any even scan line; for an even frame, only all even scan lines, for example, $2^{nd}$, $4^{th}$, $6^{th}$ and so on, are accompanied with images and no image exists corresponding to any odd scan line.

Hence, for those film modes with 30 fps or 24 fps film rate, if the broadcasting rate is set to 60 Hz as specified by NTSC, a 2-2 pulldown or a 3-2 pulldown process must be executed prior to broadcasting. FIG. 1 is a diagram showing a conventional 2-2 pulldown mode used for converting the frame format of a 30 Hz film. Referring to FIG. 1, frame 101, 102, ..., 130 denote 30 complete image frames recorded in one second, wherein the first frame 101 is divided into an even frame 101e where only all even scan lines are accompanied with images and an odd frame 101o where only all odd scan lines are accompanied with images. The same process is applied to other frames, so that 60 interlaced frames, i.e. 101e, 101o, 102e, 102o, ..., 130e, and 130o, are obtained (where a frame with a suffix "e" represents an even frame where only all even scan lines are accompanied with images and a frame with a suffix "o" represents a frame where only all odd scan lines are accompanied with images). Thus, the processed movie complies with NTSC specification where the broadcasting frequency is 60 Hz required.

FIG. 2 is a diagram showing a conventional 3-2 pulldown mode used for converting the frame format of a 24 fps film. Referring to FIG. 2, frame 201, 202, 203, ..., 224 denote 24 complete image frames recorded in one second, wherein the first frame 201 is divided into interlaced frames 201e and 201o. After that, the second frame 202 is divided into frames 202e and 202o and 202e. Further, the third frame 203 is divided into frames 203e and 203o. The same process is applied to other frames, so that 60 interlaced frames, i.e. frame 201e, 201o, 202e, 202o, ..., 224e, 224e and 224o, are obtained and the processed movie is complied with NTSC specification where the broadcasting frequency is 60 Hz required.

In addition, for those film modes with 24 fps film rate, if the broadcasting rate is set to 50 Hz as specified by PAL, a 2-2 pulldown process is to be executed prior to broadcasting. FIG. 3 is a diagram showing a conventional 2-2 pulldown mode used for converting the frame format of a 24 fps film. Referring to FIG. 3, frame 301, 302, ..., 324 denote 24 complete image frames recorded in one second, wherein the first frame 301 is divided into interlaced frames 301e and 301o. The same process is applied to other frames, so that 48 interlaced frames, i.e. frame 301e, 301o, 302e, 302o, ..., 324e, and 324o, are obtained. After further adjustment, a movie complying with PAL specification with 50 Hz broadcasting frequency is obtained.

For a playback mode with higher quality in an image display apparatus at a user end, for example, a high definition TV (HDTV), in order to get better display quality, the following processing steps are performed prior to playback: first, the received frames are determined to be interlaced frames after 2-2 pulldown or 3-2 pulldown processing; next, an inverse telecine (IVTC) is performed on the interlaced frames to obtain complete frames for playback. For example, after the interlaced frames 201e, ..., 224o as shown in FIG. 2 are received, the frames 201e and 201o are combined to form a complete frame 201, while the frames 202e and 202o are combined to form a complete frame 202. The same process is applied to other frames, so that 24 complete frames 201, 202, ..., 224 are obtained in the end.

FIG. 4 is a diagram showing the format of a film with 3-2 pulldown mode after IVTC processing. As shown in FIG. 4, the complete frame 201 obtained by foregoing process is played twice to obtain the frames 201p and 201p, and the complete frame 203 is played three times to obtain the frames 202p, 202p and 202p. The same process is applied to other frames, so that 60 complete frames can be displayed every one second by means of the playback mode as shown in FIG. 4. In comparison with the conventional TV where 60 interlaced frames are displayed every one second, the mode of FIG. 4 enables the displayed frames to appear quite smoothly without image flaws such as skipping, combing or color smearing.

In the conventional broadcasting modes of video data, the method for judging the movie mode (or pulldown mode) of the received frames (2-2 pulldown mode or 3-2 pulldown mode) includes following steps: first, performing subtractions between the pixel values of every pair of corresponding pixels of any two consecutive frames to obtain a plurality of difference values of the pixels for the two consecutive frames. Next, the pixel value differences are added together to obtain a difference value corresponding to the two consecutive frames. The above-described steps are repeated to obtain the difference values for all frames, and a difference value sequence is formed by collecting those difference values. Afterwards, the difference value sequence is compared with a threshold value to obtain a binary sequence where if the difference value is larger than the threshold value, the value of the binary sequence is set to logic 1, and if the difference value is smaller than the threshold value, the value of the binary sequence is set to logic 0. Finally, the binary sequence cadence is analyzed to judge the movie mode adopted by the original frames.

The drawback of the above-described method is that the differences between some consecutive frames and the resulted difference values thereof in the video data may be too small to determine a threshold value or to judge the adopted movie mode.

SUMMARY OF THE INVENTION

An object of the present invention is to provide a method for judging video modes, wherein by using the method the difference value between two consecutive frames in a video data is calculated, the resulted difference values for the video data are collected to form a difference value sequence and then the difference value sequence is amplified and compared with a threshold value to identify the movie mode of the video data.

Another object of the present invention is to provide an apparatus for judging video modes, wherein a difference value sequence formed by the difference values between all two consecutive frames is amplified by a high pass filter (HPF), the amplified difference value sequence is then compared with a threshold value by a comparator and finally by using a sequence analyzer the movie mode of the video data is judged.

The present invention provides a method for judging video modes. The steps of the method include: first, a plurality of frames are provided; next, the frames are compared to obtain a difference value sequence; afterwards, the difference value sequence is amplified and compared with a threshold value to obtain a binary sequence; finally, the binary sequence is analyzed to obtain an analysis result and accordingly whether or not the frames belong to a movie mode is decided.

According to the method for judging video modes as described in an embodiment of the present invention, the step for amplifying the difference value sequence is that the difference value sequence is multiplied by a factor sequence to transfer the entries with smaller difference values in the sequence into negative values, so that the originally smaller difference values are easily distinguished from other entries with medium difference value.

According to the method for judging video modes as described in an embodiment of the present invention, the factor sequence has a size of 1×3, 1×5 or others.

According to the method for judging video modes as described in an embodiment of the present invention, the step for comparing frames further includes taking two consecutive frames from the frames, performing subtractions between the two pixel values on every pair of the corresponding pixels in the two consecutive frames to obtain a plurality of pixel value differences, adding all the pixel value differences together to obtain a difference value corresponding to the two frames, repeating the above-described steps for other two consecutive frames to obtain a plurality of difference values for all the frames and forming a difference value sequence by collecting the difference values.

According to the method for judging video modes as described in an embodiment of the present invention, the method further includes processing the frames by the movie mode to obtain a first processing frame data, processing the frames by the motion-adaptive mode to obtain a second processing frame data, selecting one of the first frame data and the second processed frame data as a result frame data according to the analysis result and finally performing a comb pattern recognition on the result frame data, judging whether or not the number of the pixels having combing defect is larger than a predetermined value and resetting the analysis result if the number of the pixels having combing defect is larger.

According to the method for judging video modes as described in an embodiment of the present invention, the method further includes: detecting the result frames to decide whether or not an area signal of external image is contained; if an area signal of external image is present, relating the area signal to the analysis result to obtain a selection signal; separating the external image areas from other areas in the frames according to the selection signal; choosing all the processed areas to form a complete output frame.

According to the method for judging video modes as described in an embodiment of the present invention, the movie mode processing herein is to perform an inverse telecine (IVTC) processing on the frames.

According to the method for judging video modes as described in an embodiment of the present invention, the method for processing the frames by the motion-adaptive mode is to combine two consecutive frames to form a complete frame according to the dynamic situation of every pixel.

According to the method for judging video modes as described in an embodiment of the present invention, the movie mode herein includes 3-2 pulldown mode, 2-2 pulldown mode and other pulldown modes in any ratio.

The present invention provides an apparatus for judging video modes, which includes: a difference value generator for receiving a video data, comparing any two consecutive frames from a plurality of frames in the video data to obtain a difference value, and collecting a plurality of difference values to obtain a difference value sequence; a high pass filter (HPF) coupled to the difference value generator for amplifying the difference value sequence; a second comparator coupled to the HPF for comparing the amplified difference value sequence with a threshold value to obtain a binary sequence; a sequence analyzer coupled to the second comparator for analyzing the binary sequence to obtain an analysis result and judging a movie mode of the frames according to the analysis result.

According to the apparatus for judging video modes as described in an embodiment of the present invention, the difference value generator herein includes: a first comparator for judging whether or not a pixel value difference between every pair of corresponding pixels is larger than a predetermined value (or to decide whether or not a combing defect is present at the pixel position); an accumulator for calculating the number of the pixels with situation as described above to obtain a difference value.

According to the apparatus for judging video modes as described in an embodiment of the present invention, the apparatus further includes: a movie mode processor for processing the frames of the video data by a movie mode according to the analysis result to obtain a first processing frame data; a motion-adaptive mode processor for processing the frames of the video data by a motion-adaptive mode to obtain a second processing frame data; a switch for receiving the analysis result and an area signal, switching on one of the first processing frame data and the second processing frame data accordingly, setting the switching-on processing frame data as a result frame data and outputting the result frame data; an analysis engine for receiving and analyzing the result frame data, creating a reset signal accordingly, outputting the reset signal to the sequence analyzer, creating the area signal and outputting the area signal to the switch.

According to the apparatus for judging video modes as described in an embodiment of the present invention, the analysis engine herein includes: a comb analyzer for analyzing the output result frames, judging whether or not the number of the pixels having combing defect is larger than a predetermined value and sending out the reset signal to reset the sequence analyzer if the number of the pixels having combing defect is larger; a detector for detecting the area signal of an external image and outputting the area signal to the switch.

Since the present invention employs an HPF for amplifying the difference values corresponding to two consecutive frames in a video data, thus, it is able to identify the movie mode of video data apparently, such that the additional processing time consumed due to a judgment mistake is reduced and the efficiency for processing the difference value sequence is enhanced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 1:
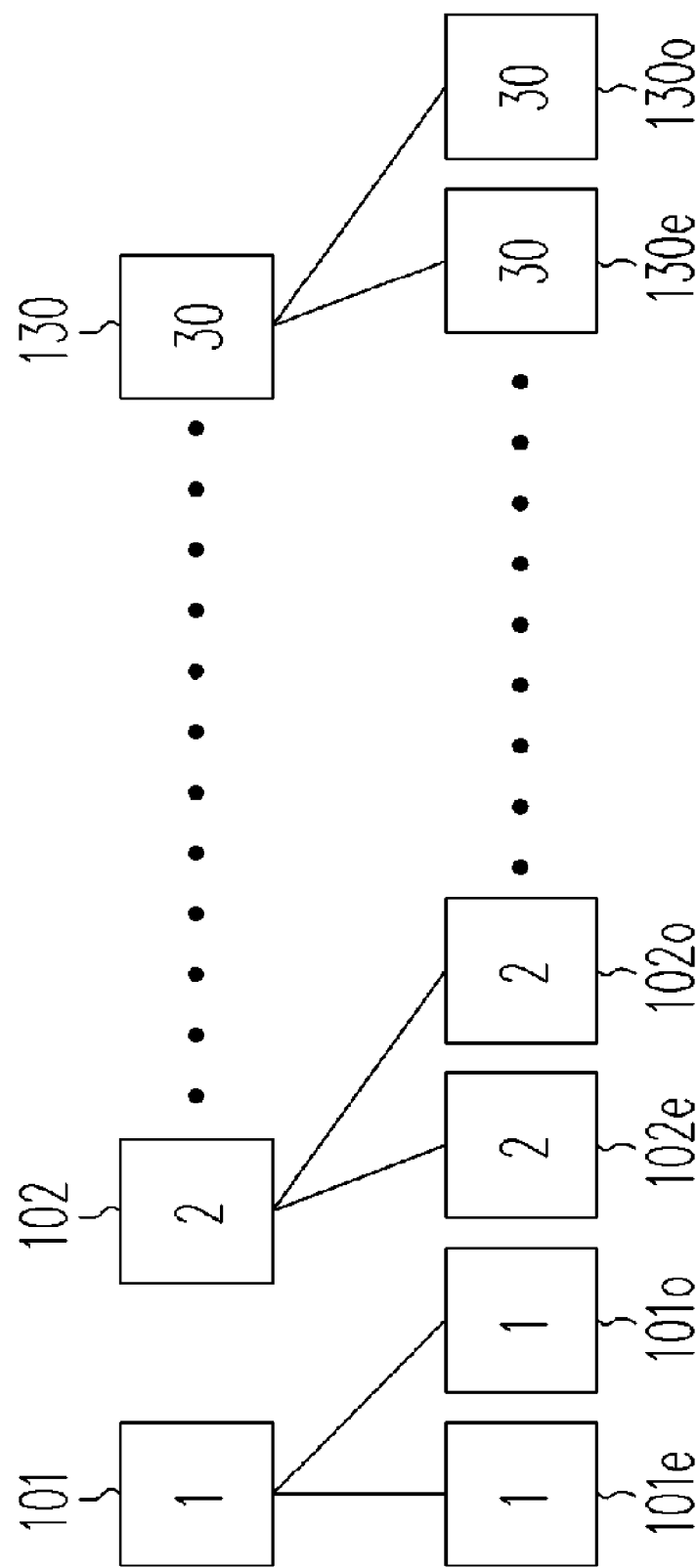
FIG. 1 is a diagram showing a 2-2 pulldown mode used for converting the frame format of 30 fps film mode in the prior art.
Figure 2:
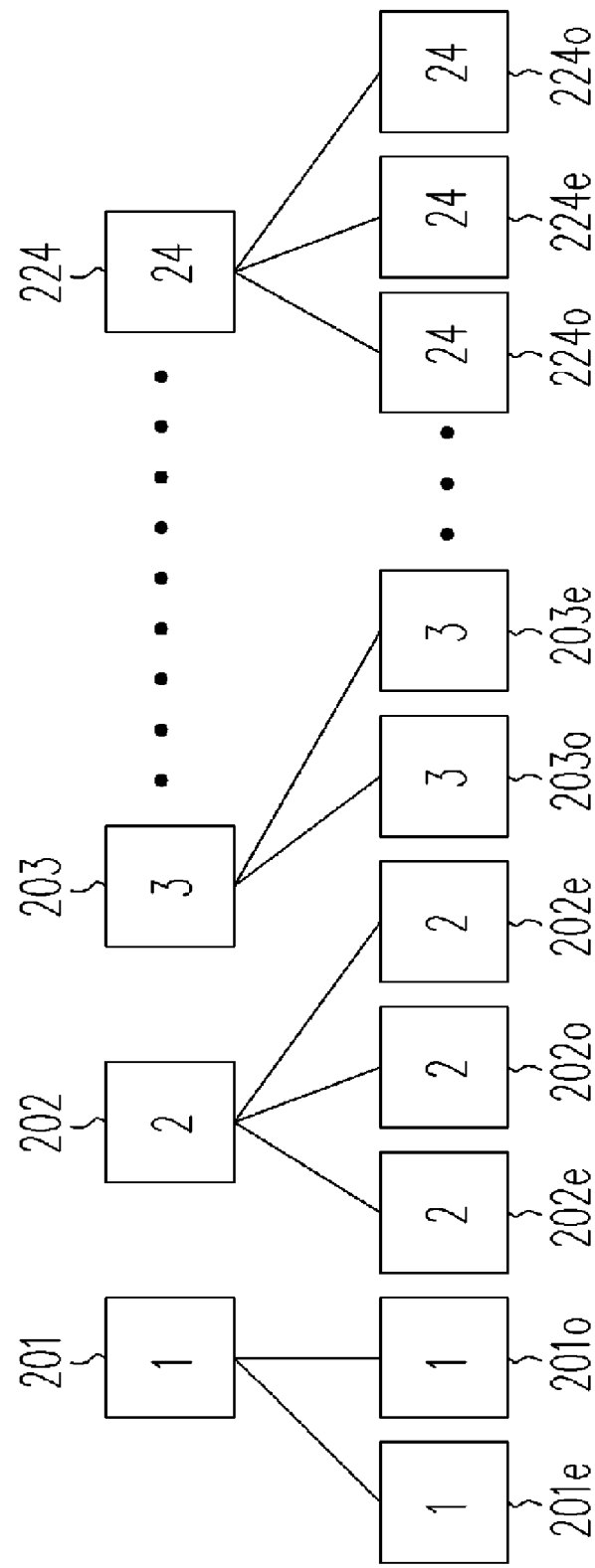
FIG. 2 is a diagram showing a 3-2 pulldown mode used for converting the frame format of 24 fps film mode in the prior art.
Figure 3:
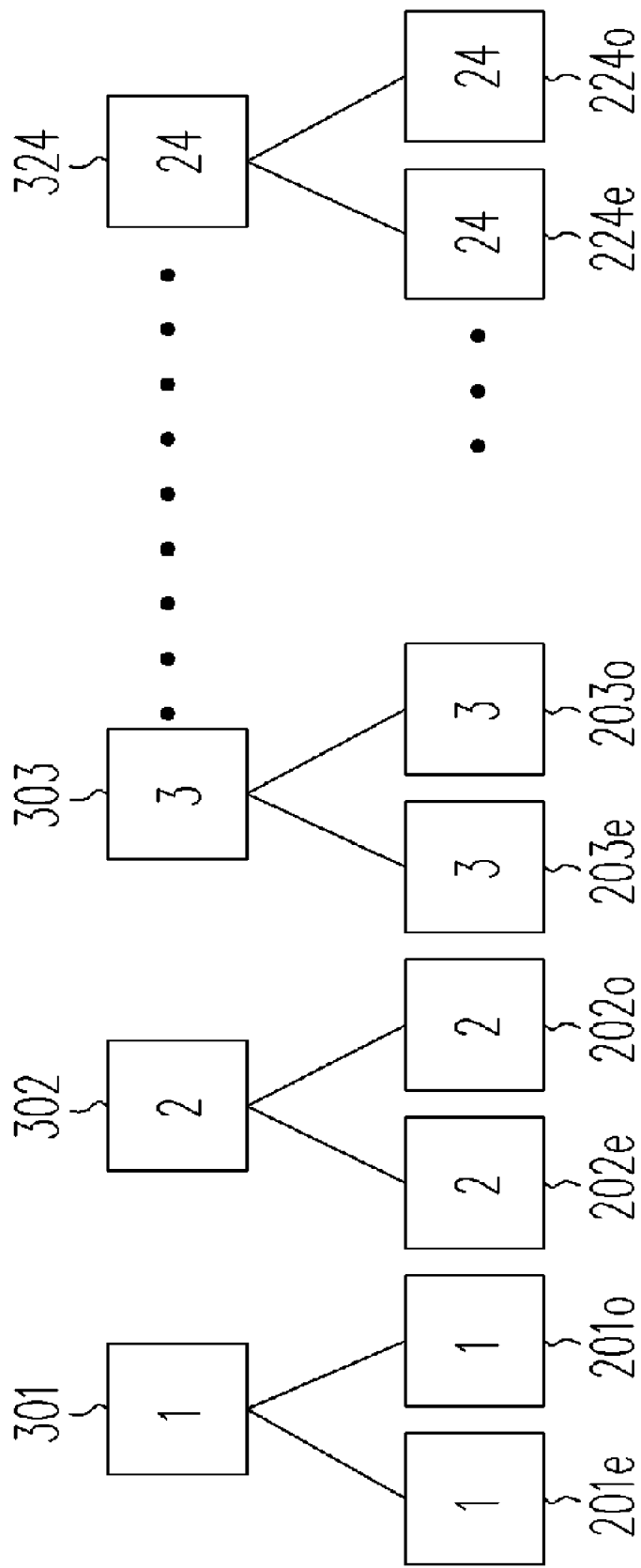
FIG. 3 is a diagram showing a 2-2 pulldown mode used for converting the frame format of 24 fps film mode in the prior art.
Figure 4:
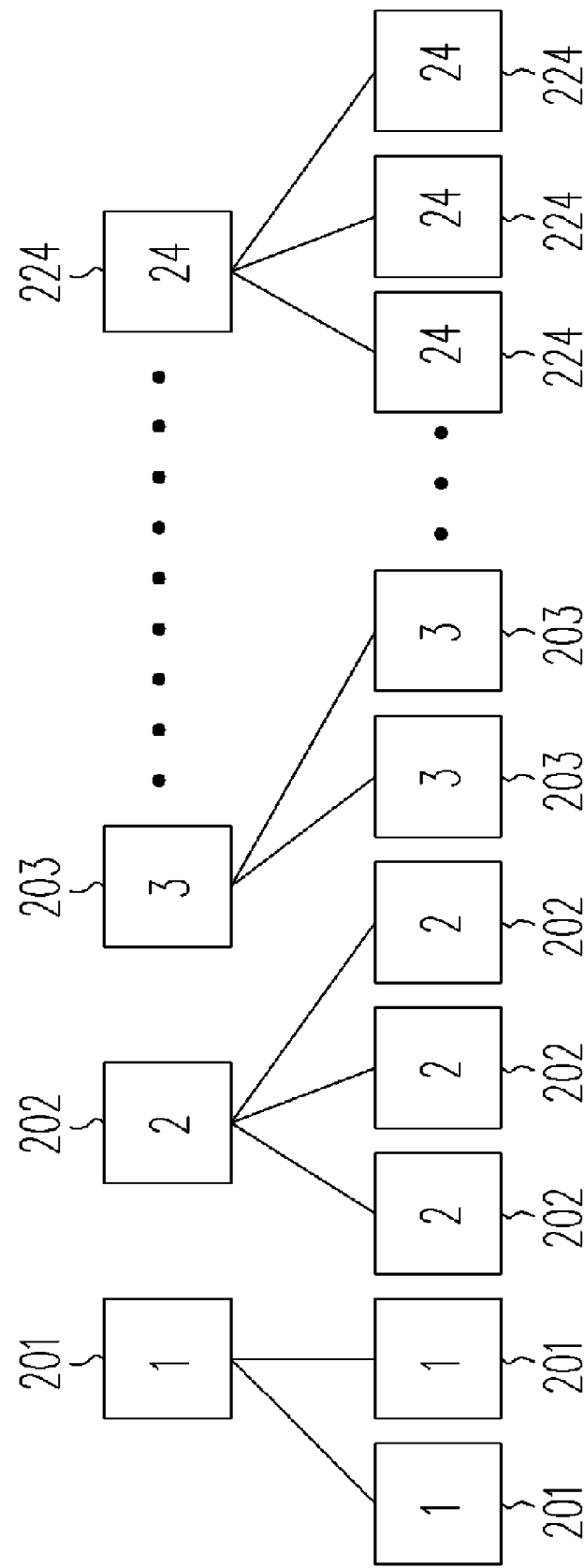
FIG. 4 is a diagram showing how the frame format of a video mode obtained by 3-2 pulldown processing is re-transferred by IVTC processing in the prior art.
Figure 5:
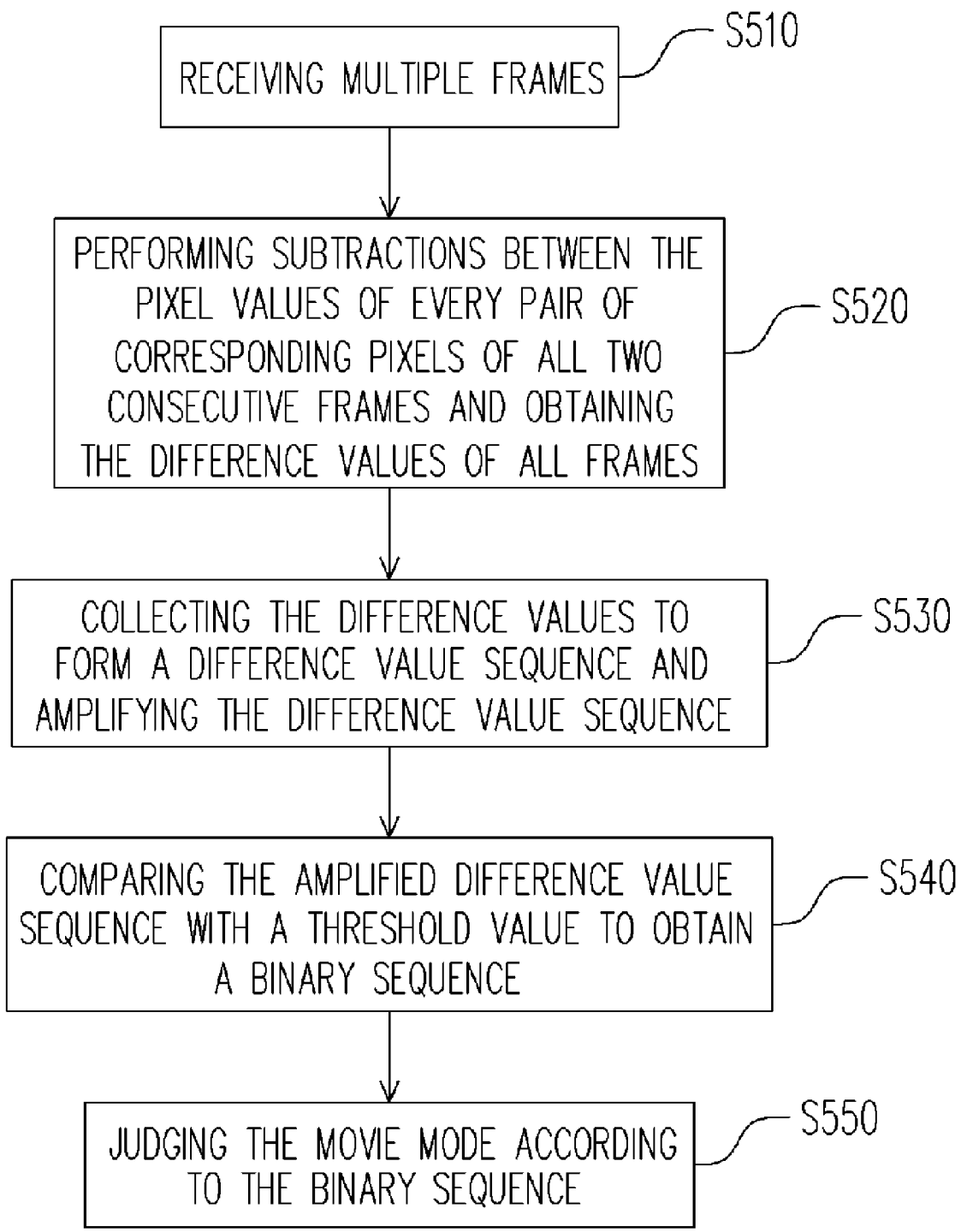
FIG. 5 is a flowchart of the method for judging a video mode according to an embodiment of the present invention.

FIG. 5 is a flowchart of the method for judging a video mode according to an embodiment of the present invention. First, multiple frames is provided (step S510). Next, the pixel values of every pair of corresponding pixels of two consecutive received frames are subtracted to each other, and the number of the pixels with a pixel difference value larger than a predetermined value in a complete frame or the number of the pixels with combing (feathering) defect in two consecutive frames are calculated to obtain difference values of all frames (step S520). Afterwards, the difference values of all frames are collected to form a difference value sequence, which is then amplified by an HPF to emphasize the difference of between each two consecutive frames. The HPF can be a factor sequence with 1×3 size or 1×5 size and the difference value sequence is amplified through multiplying the difference value sequence by the factor sequence (step S530). Further, the amplified difference value sequence is compared with a threshold value to obtain a binary sequence, wherein an entity with a difference value larger than the threshold value is set to logic 1, while an entity with a difference value smaller than the threshold value is set to logic 0 (step S540). Finally, the binary sequence is analyzed to obtain an analysis result, and according to the analysis result whether or not the received original frames belong to a movie mode and which movie mode is judged (step S550). Wherein, the above-mentioned movie mode is, but not limited to, 3-2 pulldown mode or 2-2 pulldown mode. A user is able to use a pulldown mode with other ratios depending on the practical need thereof without departing from the scope or spirit of the invention.

Figure 6:
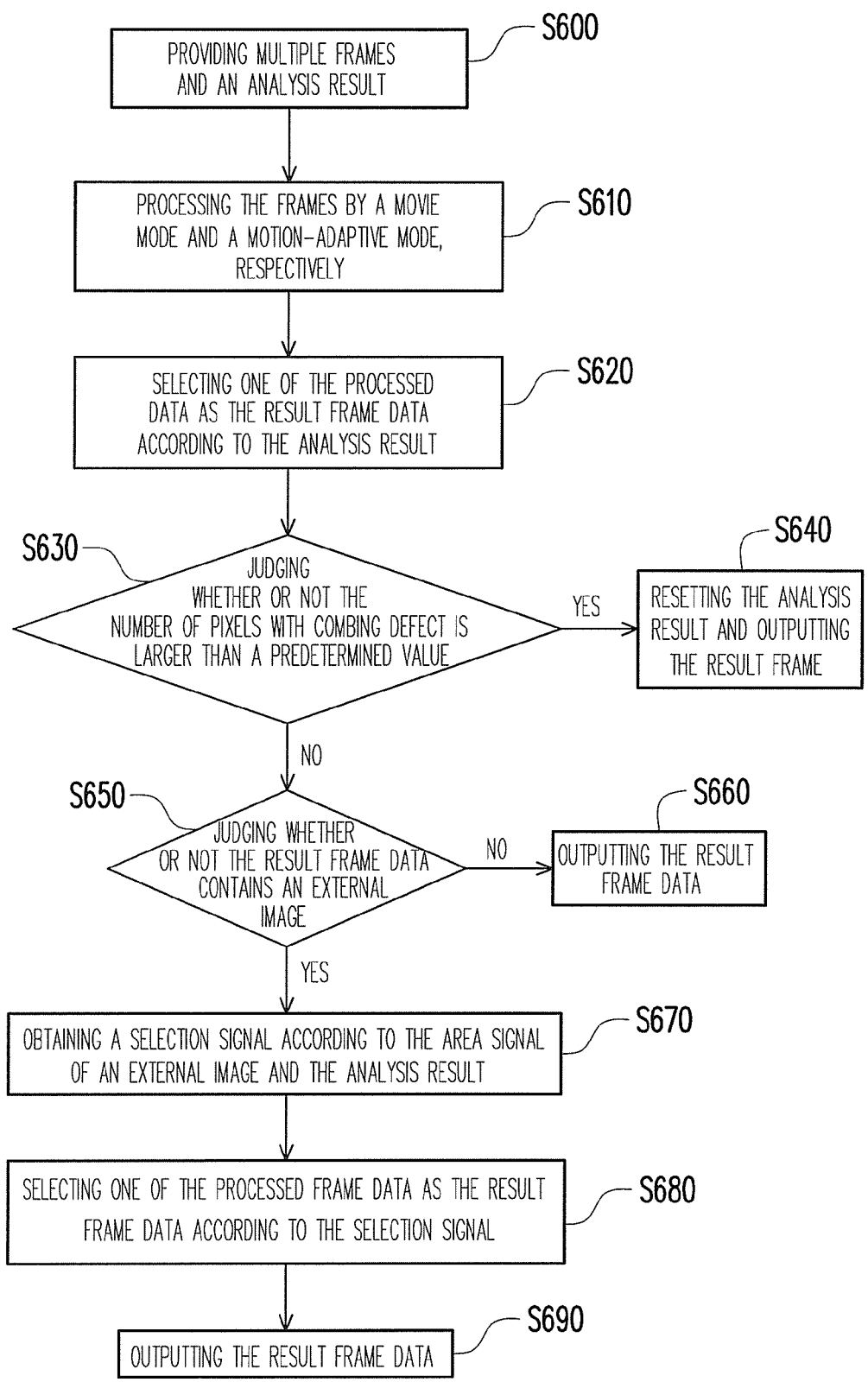
FIG. 6 is a flowchart of the method for video data processing and analyzing according to an embodiment of the present invention.

FIG. 6 is a flowchart of the method for processing and analyzing video data according to an embodiment of the present invention. First, multiple frames of a video data and an analysis result are provided, wherein the analysis result reveals the movie mode of the video data (step S600). Next, the frames are processed with a movie mode and a motion-adaptive mode to obtain a first processed frame data and a second processed frame data, respectively. Afterwards, according to the above-described analysis result, one of the first processed frame data and the second processed frame data is selected as a result frame data (step S620). Further, a comb pattern recognition is performed on the result frame data for deciding whether or not the number of the pixels with combing defect in a complete frame of the result frame data is larger than a predetermined value (step S630). If the number of the pixels in step S630 is larger than the predetermined value, the analysis result is reset and the result frame is output (step S640). If the number of the pixels in step S630 is smaller than the predetermined value, whether or not the frame data contains an area signal of an external image is further judged (step S650). If no area signal is contained, the result frame data is output (step S660). If the frame data contains the area signal, a selection signal is obtained according to the area signal and the original analysis result (step S670). Furthermore, according to the selection signal, one of the first processing frame data and the second processed frame data is re-selected as the result frame data (step S680). Finally, the result frame data is output (step S690).

Figure 7:
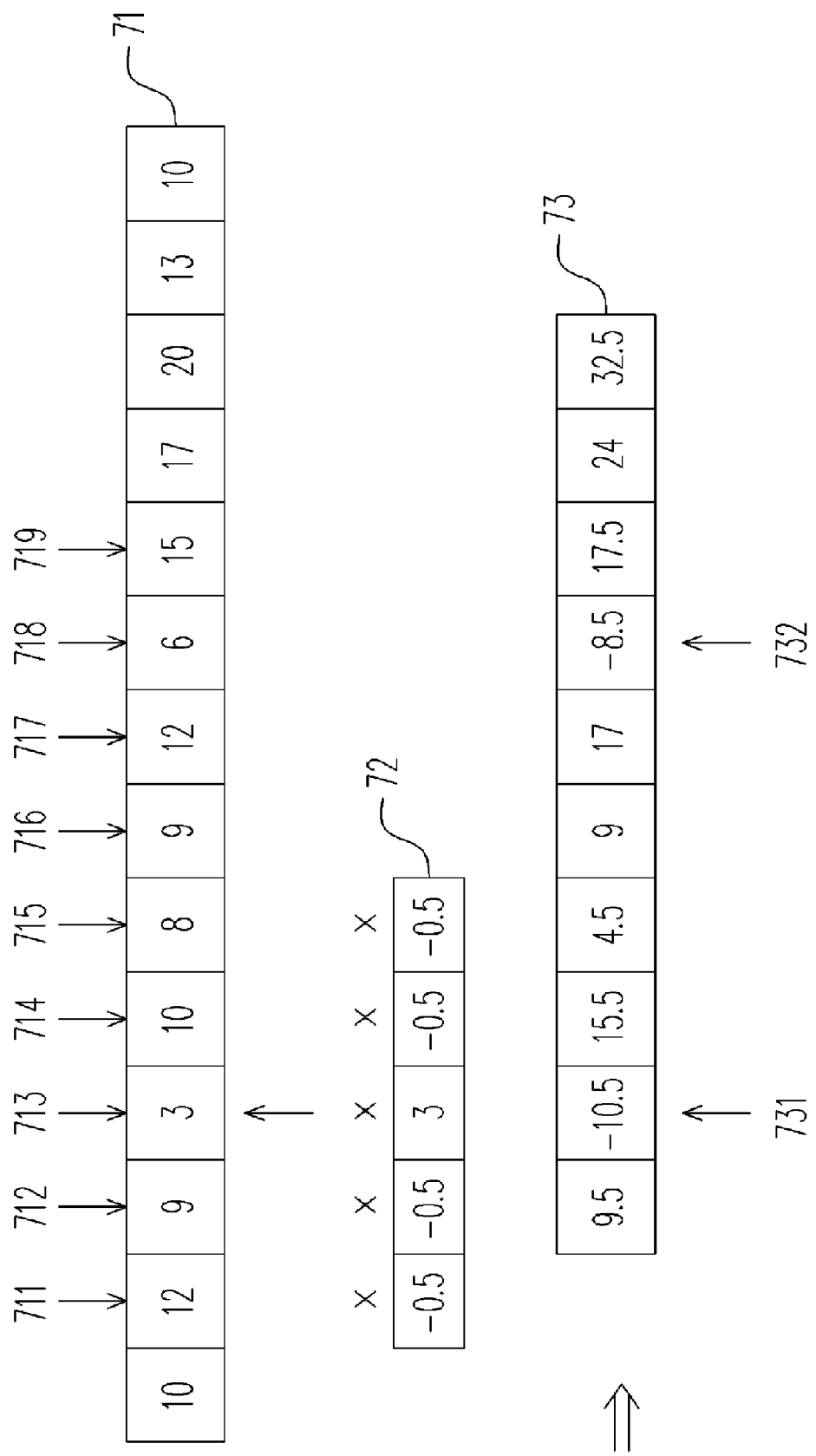
FIG. 7 is an algorithm example for amplifying a difference value sequence according to an embodiment of the present invention.

FIG. 7 is an example for amplifying a difference value sequence according to an embodiment of the present invention, wherein the difference value sequence is multiplied by a factor sequence to transfer smaller difference values in the difference value sequence into negative values so as to better distinguish the entries with the negative values from other entries with medium difference values. Referring to FIG. 7, a factor sequence with 1×5 size is used as exemplary, wherein a difference value sequence 71 is multiplied by a factor sequence 72 to obtain a result sequence 73. When an entry 713 of difference value in the difference value sequence 71 is taken to be processed, the entries of difference value 711, 712, 713, 714 and 715 are multiplied by a 1×5 factor sequence {−0.5, −0.5, 3, −0.5, −0.5}, respectively, and all the products are added together to obtain an result value 731, wherein the calculation can be expressed by (−0.5×12)+(−0.5×9)+(3×3)+ (−0.5×10)+(−0.5×8)=−10.5 and the calculation method is applied to other entries of difference value. By collecting all of the obtained result values, a result sequence 73 is obtained. It can be found in the result sequence 73 that the smaller difference values in the original difference value sequence, such as the entries of difference value 713 and 718, have negative values as the result values thereof, such as the entries 731 and 732. Therefore, these smaller difference values can be distinguished from other medium difference values more clearly, which is helpful for successively judging movie mode. However, the factor sequence with 1×5 size herein is used as an example only, and the present invention does not limit the size of a factor sequence. A user can use a factor sequence with other sizes depending on the practical need thereof without departing from the scope or spirit of the invention.

Figure 8:
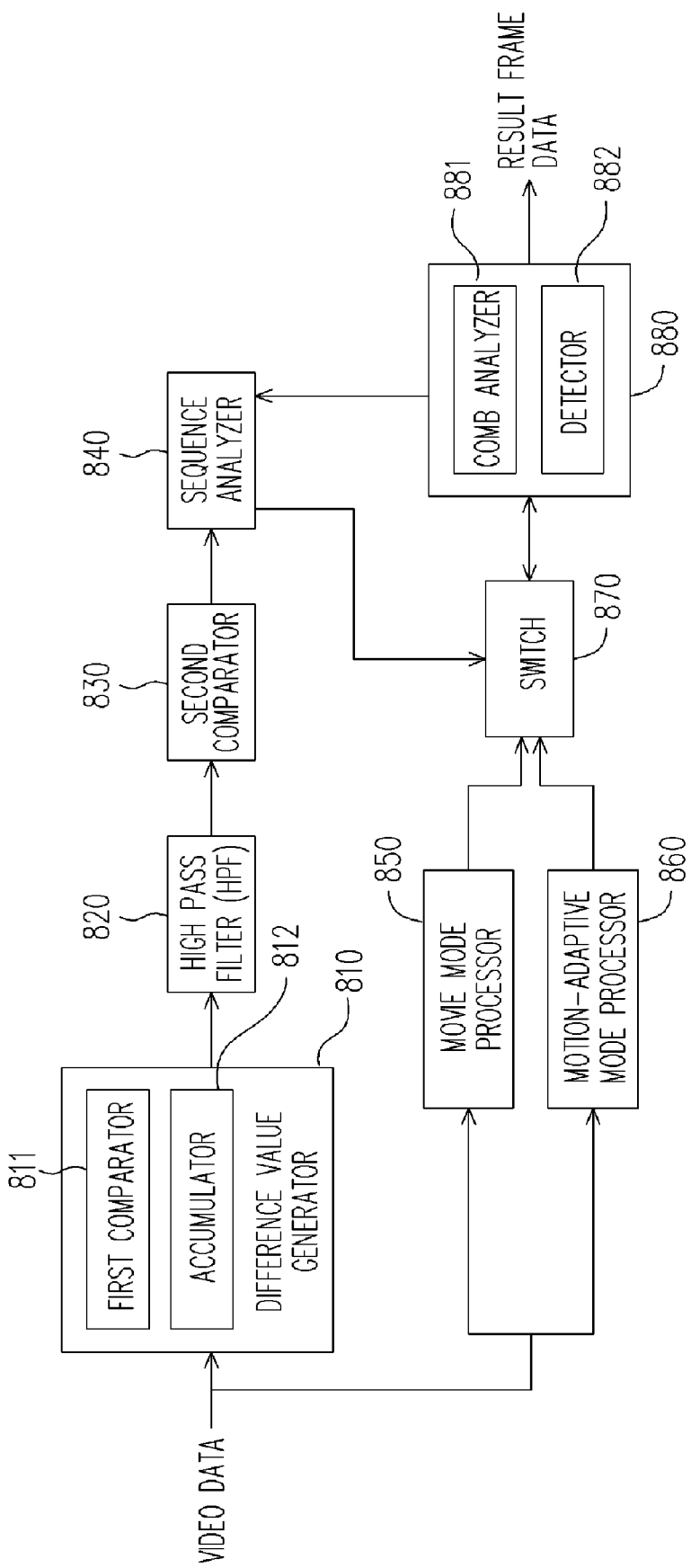
FIG. 8 is a block diagram of a video processing apparatus according to an embodiment of the present invention.

FIG. 8 is a block diagram of a video processing apparatus according to an embodiment of the present invention. First, a video data is input to a difference value generator 810, where a first comparator 811 in the difference value generator 810 calculates pixel difference values between the pixel values of every pair of corresponding pixels of two consecutive received frames in the video data, an accumulator 812 in the difference value generator 810 adds all the pixel difference values for a complete frame to obtain a difference value and all the difference values for all frames are collected to form a difference value sequence. Next, the difference value sequence is input to a HPF 820, the HPF 820 amplifies the difference value sequence and the amplified results are sent to a second comparator 830 for a comparison with a threshold value. If an entry of the amplified difference value sequence has a difference value larger than the threshold value, the entry is set to logic 1, while an entry with a difference value smaller than the threshold value is set to logic 0 and in this way, a binary sequence is formed. The binary sequence is sent to a sequence analyzer 840 for analyzing the binary sequence to obtain an analysis result and according to the analysis result the movie mode of the video data is judged. On the other hand, during judging the movie mode the video data is also input to a movie mode processor 850 and a motion-adaptive mode processor 860 for processing, respectively. From the processors 850 and 860, a first processing frame data and a second processing frame data are obtained, respectively, and further sent to a switch 870. According to the above-mentioned judgment result of movie mode of the video data, the switch 870 would select one of the first processing frame data and the second processing frame data as a result frame data sent to an analysis engine 880. A comb analyzer 881 in the analysis engine 880 performs a comb analysis on the received result frame data. If the comb analyzer 881 has found a comb signal contained in the result frame data, the analysis engine 880 sends out a reset signal to the sequence analyzer 840 to reset the sequence analyzer 840. In addition, a detector 882 in the analysis engine 880 would also detect the result frame data to judge whether or not the result frame data contains an area signal of an external image. If the frame data contains the area signal, the area signal would be sent to the switch 870 to select the result frame data accordingly. If the frame data does not contain the comb signal and the area signal, the analysis engine 880 outputs the result frame data.

In summary, according to the method and an apparatus for processing videos of the present invention, since an HPF is employed to amplify the difference values between all two consecutive frames so as to more correctly identify the movie mode of the original video data, the drawbacks that the threshold value is hard to be determined or the movie mode of the video data is hard to be judged in the prior art are avoided.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A method for judging video modes, comprising the following steps:
   providing a plurality of frames;
   comparing every two consecutive frames of the plurality of frames to obtain a difference value sequence;
   amplifying the difference value sequence, wherein the difference value sequence is multiplied by a factor sequence to transfer the entries with less difference values in the difference value sequence into the entries with negative values for being better distinguished from other entries with medium values;
   comparing the amplified difference value sequence with a threshold value to obtain a binary sequence; and
   analyzing the binary sequence to obtain an analysis result and hereby judging whether the frames belong to a movie mode.

2. The method for judging video modes as recited in claim 1, wherein the size of the factor sequence is one of 1×3 or 1×5.

3. The method for judging video modes as recited in claim 1, wherein the step for comparing the frames further comprises:
   (a) taking two consecutive frames from the frames, performing subtractions between the two pixel values on every pair of the corresponding pixels in the two consecutive frames to obtain a set of pixel difference values, comparing every pixel difference value with a predetermined value to obtain a number of the pixels with a pixel difference value larger than the predetermined value corresponding to the two consecutive frames and setting the number of the pixels as a difference value; and
   (b) repeating step (a) on all frames to obtain a plurality of difference values and collecting the difference values to form the difference value sequence.

4. The method for judging video modes as recited in claim 1, wherein the step for comparing the frames further comprises:
   (a) taking two consecutive frames from the frames and calculating the number of pixels, which are located at the same position in the two consecutive frames correspondingly and have a combing defect, to obtain a difference value; and
   (b) repeating step (a) on all frames to obtain a plurality of difference values and collecting the difference values to form the difference value sequence.

5. The method for judging video modes as recited in claim 1, further comprising:
   processing the frames by the movie mode to obtain a first processing frame data;
   processing the frames by the motion-adaptive mode to obtain a second processing frame data;
   selecting one of the first processing frame data and the second processing frame data as a result frame data according to the analysis result; and
   performing a comb pattern recognition on the result frame data, judging whether or not the number of the pixels having combing defect is larger than a predetermined value and resetting the analysis result if the number of the pixels having combing defect is larger.

6. The method for judging video modes as recited in claim 5, further comprising:
   detecting the result frame data to decide whether or not an area signal of an external image is contained;
   relating the area signal to the analysis result to obtain a selection signal if an area signal of an external image is contained; and
   separating the external image areas from other areas in the frames according to the selection signal, processing each area by corresponding processing modes, and combining the processed areas to form a complete output frame.

7. The method for judging video modes as recited in claim 5, wherein the method for processing the frames by the movie mode is to perform an inverse telecine (IVTC) processing on the frames.

8. The method for judging video modes as recited in claim 5, wherein the method for processing the frames by the motion-adaptive mode is to combine two consecutive frames according to the dynamic situation of every pixel to obtain a complete frame.

9. The method for judging video modes as recited in claim 1, wherein the movie mode comprises 3-2 pulldown mode, and 2-2 pulldown mode.

10. An apparatus for judging video modes, comprising:
   a difference value generator for receiving a video data, comparing two consecutive frames of a plurality of frames in the video data to obtain a difference value and collecting a plurality of the difference values to obtain a difference value sequence;
   a high pass filter (HPF), coupled to the difference value generator for amplifying the difference value sequence;
   a second comparator, coupled to the HPF for comparing the amplified difference value sequence with a threshold value to obtain a binary sequence; and
   a sequence analyzer, coupled to the second comparator for analyzing the binary sequence to obtain an analysis result and hereby judging a movie mode of the frames.

11. The apparatus for judging video modes as recited in claim 10, wherein the HPF is that the difference value sequence is multiplied by a factor sequence to transfer the entries with less difference values in the difference value sequence into the entries with negative values for being better distinguished from other entries with medium values.

12. The apparatus for judging video modes as recited in claim 11, wherein the size of the factor sequence is one of 1×3 or 1×5.

13. The apparatus for judging video modes as recited in claim 10, wherein the difference value generator comprises:
   a first comparator for judging whether or not a pixel value difference between the pixel values of every pair of corresponding pixels is larger than a predetermined value; and
   an accumulator for calculating the number of the pixels in the frame whose pixel value difference is judged to be larger than the predetermined value by the first comparator to obtain a difference value.

14. The apparatus for judging video modes as recited in claim 10, wherein the difference value generator comprises:
   a first comparator for detecting and comparing every pair of the corresponding pixels in two consecutive frames to decide whether or not a combing defect is present; and
   an accumulator for calculating the number of the pixels in the frame having the combing defect as judged by the first comparator to obtain a difference value.

15. The apparatus for judging video modes as recited in claim 10, further comprising:
   a movie mode processor for processing the frames of the video data by a movie mode according to the analysis result to obtain a first processing frame data;
   a motion-adaptive mode processor for processing the frames of the video data by a motion-adaptive mode to obtain a second processing frame data;
   a switch for receiving the analysis result and an area signal, switching on one of the first processing frame data and the second processing frame data accordingly, setting the switching-on processing frame data as a result frame data and outputting the result frame data; and
   an analysis engine for receiving and analyzing the result frame data, creating a reset signal accordingly, outputting the reset signal to the sequence analyzer, creating the area signal and outputting the area signal to the switch.

16. The apparatus for judging video modes as recited in claim 15, wherein the analysis engine comprises:
   a comb analyzer for analyzing the output result frames, judging whether or not the number of the pixels having combing defect is larger than a predetermined value and sending out the reset signal to reset the sequence analyzer if the number of the pixels having combing defect is larger; and
   a detector for detecting the area signal of an external image and outputting the area signal to the switch.

17. The apparatus for judging video modes as recited in claim 15, wherein the method for processing the frames by the movie mode is to perform an inverse telecine (IVTC) processing on the frames.

18. The apparatus for judging video modes as recited in claim 14, wherein the method for processing the frames by the motion-adaptive mode is to combine two consecutive frames according to the dynamic situation of every pixel to obtain a complete frame.

19. The apparatus for judging video modes as recited in claim 14, wherein the movie mode comprises one of 3-2 pulldown mode and 2-2 pulldown mode.

* * * * *